United States Patent [19]

Verwilst et al.

[11] Patent Number: 5,071,683
[45] Date of Patent: Dec. 10, 1991

[54] METHOD FOR FORMING A GELLIFIED POLYURETHANE LAYER ON A SURFACE

[75] Inventors: Jacques Verwilst, Wetteren; Hugo De Winter, Gentbrugge; André Braeckman, Wetteren; Bernard De Baes, Damme-Sijsele, all of Belgium

[73] Assignee: Gechem and Recticel, Brussels, Belgium

[21] Appl. No.: 216,602

[22] Filed: Jul. 8, 1988

[30] Foreign Application Priority Data

Jul. 16, 1987 [BE] Belgium ............................. 8700792

[51] Int. Cl.⁵ ............................................. B05D 1/30
[52] U.S. Cl. ....................................... 427/420; 427/421; 427/426; 264/331.19; 239/399; 239/489; 239/493; 239/DIG. 7
[58] Field of Search ................. 427/426, 420; 264/309, 264/331.19; 239/399, 432, 488, 489, 493, DIG. 1

[56] References Cited

U.S. PATENT DOCUMENTS

| | | | |
|---|---|---|---|
| 3,462,083 | 8/1969 | Kautz | 427/426 X |
| 4,234,445 | 11/1980 | Hagen | 427/426 X |
| 4,337,281 | 6/1982 | Boone | 427/236 |
| 4,543,366 | 9/1985 | Smith | 427/426 X |
| 4,603,813 | 8/1986 | Luegering | 239/399 |
| 4,809,909 | 3/1989 | Kukesh | 427/426 X |

OTHER PUBLICATIONS

ASTM; "Standard Practice for Determining Data Criteria and Processing for Liquid Drop Size Analysis"; E799-81; pp. 710-715; 1982.

*Primary Examiner*—Shrive P. Beck
*Assistant Examiner*—Alain Bashore
*Attorney, Agent, or Firm*—Sughrue, Mion, Zinn, Macpeak & Seas

[57] ABSTRACT

Method and device for forming a gellified polyurethane layer on a surface, notably of a mould, by spraying the liquid reaction mixture comprising polyol and isocyanates and which has a viscosity between 20 and 2000 centipoises. The mixture is sprayed in the form of a film of liquid and/or raindrops of which the main part has a mean diameter (Medium Volume Diameter; "M.V.D.") which, according to the standards ASTM E 779-81, is larger than 100 microns and preferably larger than 500 microns.

10 Claims, 7 Drawing Sheets

METHOD FOR FORMING A GELLIFIED POLYURETHANE LAYER ON A SURFACE

BACKGROUND OF THE INVENTION

The invention relates to a method for forming a gellified polyurethane layer on a surface, notably of a mould, by spraying a liquid reaction mixture comprising polyol and isocyanates and which has a viscosity between 20 and 2000 centipoises.

The invention relates more particularly to a method for forming, by spraying, an elastomer layer of polyurethane which is preferably stable to light and which serves in particular for aesthetical recovering, such as the internal recovering of a vehicle. For this case more particularly the technique of the so-called "airless two components systems without solvent means" is used.

Due to the relatively high viscosity of such a reaction mixture, the relatively important thickness of the polyurethane layer, to the fact that it is useful to apply on the surface within a single passage, and finally due to the necessity of a quick gellification of the polyurethane in order to avoid the running off of the reactive material on the surface of the mould under the influence of the gravitation force, the following has been established. If the known technique is applied, micro air-bubbles remain enclosed in the gellified polyurethane layer due to a heterogenity caused by the spraying of the mixture on the surface, irregularities arise in the density and other physical characteristics, such as the colour of the thus formed layer by the prior art method.

SUMMARY OF THE INVENTION

The object of the invention is to provide a solution for this problem.

According to the invention the mixture is sprayed in the form of a film of liquid and/or of raindrops of which the main part has a mean diameter (Medium Volume Diameter; "M.V.D.") which, according to the standards ASTM E 779-81, is larger than 100 microns and preferably larger than 500 microns.

In a preferred embodiment of the invention, the mixture is sprayed under the form of a film which extends from a mouthpiece according to an eventually somewhat cambered cone, the top angle of which being comprised between 10° and 80° and preferably between 20° and 40°.

According to a preferred embodiment of the invention the mixture is sprayed on the surface with a throughput ranging between 5 to 100 g/sec, preferably between 10 to 30 g/sec.

The invention also relates to a device for forming, by spraying, a gellified polyurethane layer on a surface, notably by applying the method described hereabove.

The device is characterized by the fact that it comprises a mouthpiece in the head of which an injector is mounted showing a funnel-shaped cavity. The funnel-shaped cavity on one hand issues forth into a substantially cylindrical channel having a length of 0 to 5 mm, and preferably of 0.1 to 2 mm and this cavity is connected with an injection aperture. On the other hand, the funnel-shaped cavity has a connection to a mixture chamber wherein reaction components for obtaining polyurethane are introduced. At the entrance of the funnel-shaped cavity, means are provided for conducting according to a screw or whirl movement the already formed polyurethane and/or the reaction components through the injection aperture.

Other particularities and advantages of the invention will become clear from the description given hereunder which refers to the figures which relate to particular embodiments of the method and the device according to the invention. The description is only given by way of example and does not limit the invention. The references used hereunder relate to the figures.

DETAILED DESCRIPTION OF THE PREFERRED EMBODIMENT

In the different figures the same references relate to the same or analogous elements.

The invention relates to a method for forming a gellified polyurethane layer on a surface, more particularly on an adequate surface of a mould.

An object of the invention is in particular the formation, in a mould, of an elastomer layer of polyurethane which is stable to light and which has a minimal thickness of 0.3 mm, and preferably ranging between 0.5 and 2 mm, so that a print is obtained which serves as aesthetical recovering, in particular for orning the dashboard of automobiles. The elastomer layer is preferably formed according to the so-called "airless two-component-system in absence of substantially absence of solvent means".

Figure 1:
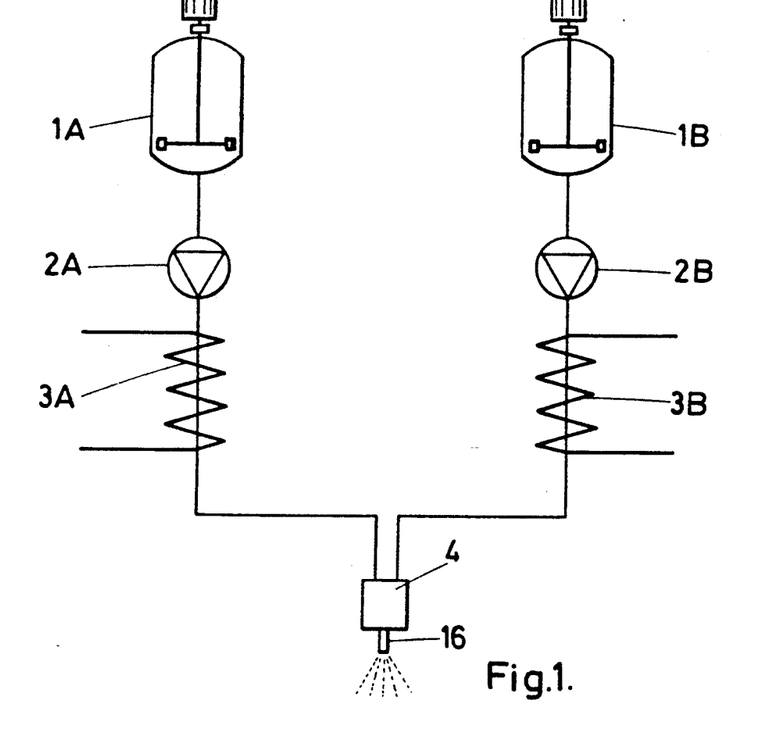
FIG. 1 gives a schematic view of a general method according to the invention.

FIG. 1 represents a schematic view of the applied method.

In a first step, the two components, i.e. polyol and isocyanates, are proportioned starting from a tanks 1A and 1B, respectively, by means of gauge pumps 2A and 2B, respectively. In a second step, the two components are brought at an adequate temperature by means of a heat exchanger respectively 3A and 3B before to be mixed in a mixing head 4 on which a mouthpiece 16 is connected. A beam of the thus formed reaction mixture is sprayed on a mould surface in order to form said elastomer layer.

According to the invention, the reaction mixture is sprayed under the form of a film and/or of raindrops of which the largest part has a mean diameter (Medium Volume Diameter) according to the standards ASTM E 779-81 higher than 100 microns and preferably higher than 500 microns.

Figure 2:
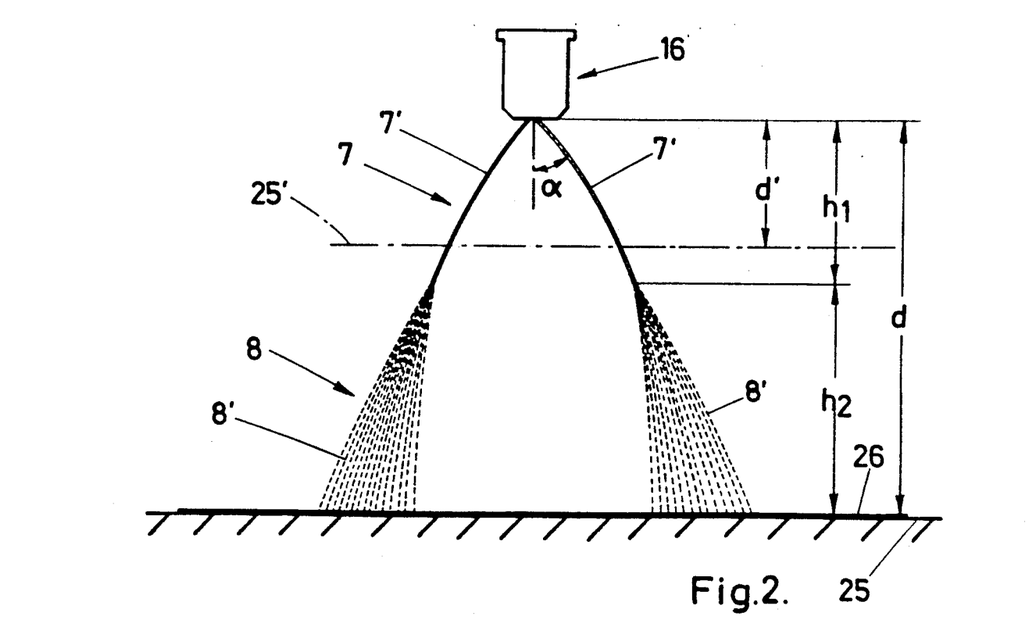
FIG. 2 gives a schematic view of a longitudinal section of a liquid beam obtained by applying the method according to the invention.

As shown in FIG. 2, the beam of liquid which is sprayed out of the mouthpiece, comprises generally two parts 7 and 8 of which the physical aspect is substantially different. Part 7, which is the closest to the mouthpiece, is formed by a film 7' which extends according to the surface of a cone with a cross-section having the form of a circle or an oval, depending on the kind of mouthpiece used, while part 8 of that film is broken up into drops 8'.

Generally one tries to maintain a distance d between the mouthpiece 16 and the surface on which the elastomer has to be formed, which distance lies between 0.5 cm and 30 cm and preferably between 15 and 20 cm.

FIG. 2 shows, in plane lines, a first advantageous case where the surface 25 to be covered by an elastomer layer 26 is at a distance d of the mouthpiece 16, which is larger than the height $h_1$ of the part 7 of the diameter of the reaction mixture. In broken lines in FIG. 2, a second case is shown wherein the surface 25' is at a distance d' which is smaller than that height $h_1$. In the first case, the layer 26 is formed by the drops 8, while in the second case it is formed by the film 7'.

The height $h_1$ of part 7 is, for a same mouthpiece, essentially determined as a function of the viscosity of the reaction mixture, of the angle $\alpha$, and of the throughput of the sprayed liquid.

Thus, those parameters are adjusted in an advantageous manner such that the height $h_1$ of part 7 ranges between 0.5 and 20 cm.

Moreover, it has to be noted that preferably this mixture should be sprayed in the form of a film which extends starting from the mouthpiece 16 and according to a hollow, possibly somewhat cambered, cone of which the top angle $\alpha$ is between 5° and 80° and preferably between 20° and 40°.

However if, for example, for pratical reasons, the reaction mixture has to be distributed substantially in the form of drops over the surface to be covered, it has been established that the most favourable results can be obtained when the largest part of those drops 8' shows a relatively large mean diameter, which is between 1000 and 5000 microns, and preferably between 500 and 3000 microns.

The height $h_2$ of part 8, compared to that of part 7, can be relatively important if the reaction mixture is sprayed with a relatively limited throughput on the surface to be covered.

As has been schematically represented in FIG. 2, starting from a certain distance with respect to part 7, the drops spread themselves, on an substantially uniform manner over a large part of the cross-section of the cone, in the part 8 where they are formed. This is in contrast to what is the case in part 7 where the liquid essentially extends in the form of a hollow cone.

FIGS. 3 to 6 relate to a spray-gun, which according to the invention, can be used for applying the method described above.

Figure 3:
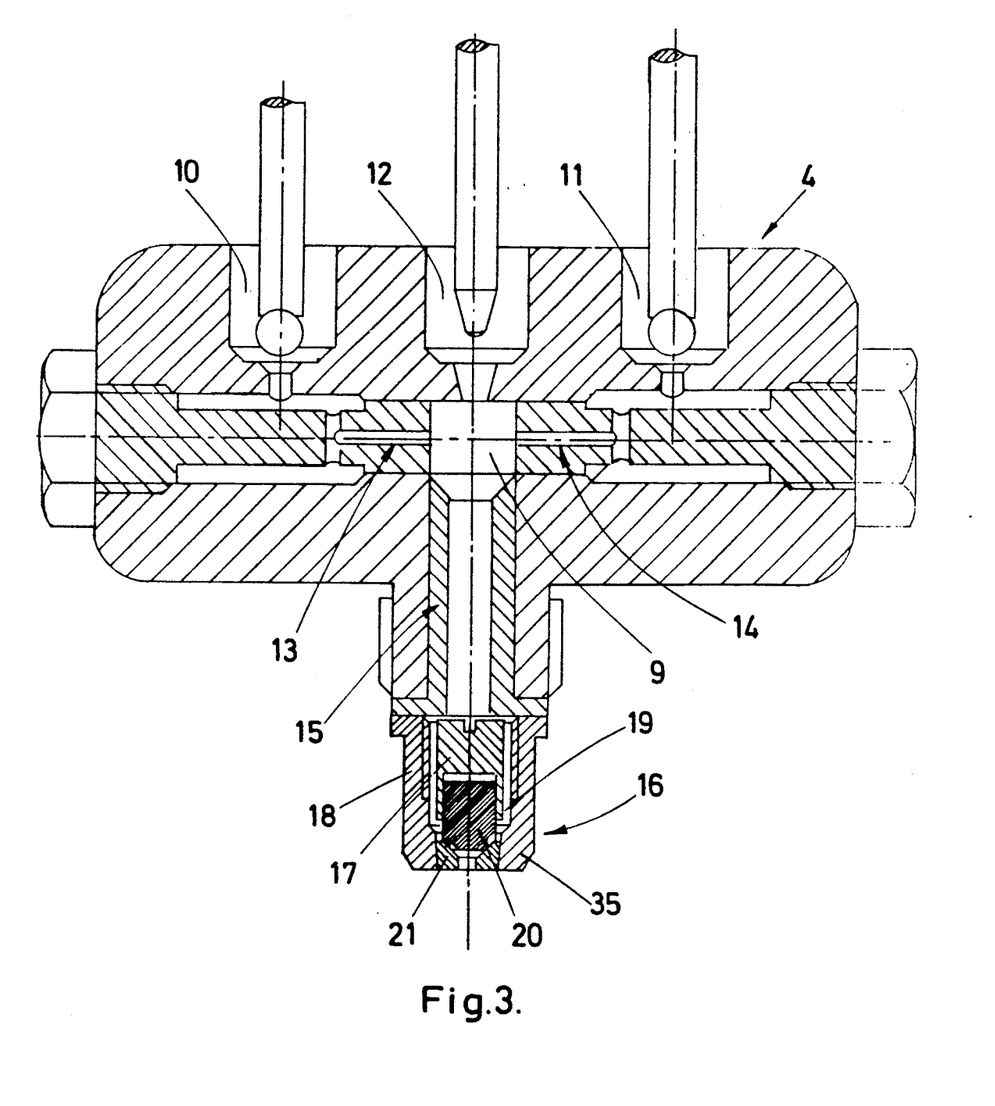
FIG. 3 is a view in cross-section of a part of a first embodiment of the device according to the invention for applying a method according to the invention.

The gun essentially comprises a mixing chamber 9 having an input for polyol 10, for isocyanate 11, and for rinsing means 12, which can be closed by means of a ball-valve.

The injectors 13 and 14 for the polyol and the isocyanates are respectively provided between the inputs 10 and 11, on the one side, and the mixing chamber 9, on the other side. Those injectors issue forth in that chamber 9 according to opposite directions and thus enable the introduction with a relatively high speed of the polyol and the isocyanates in counter-current in that chamber.

The mixture thus obtained in that chamber is further conducted to a mouthpiece 16 by means of a conduct 15.

The FIGS. 3 to 6 relates to a first embodiment of such a mouthpiece.

Figure 4:
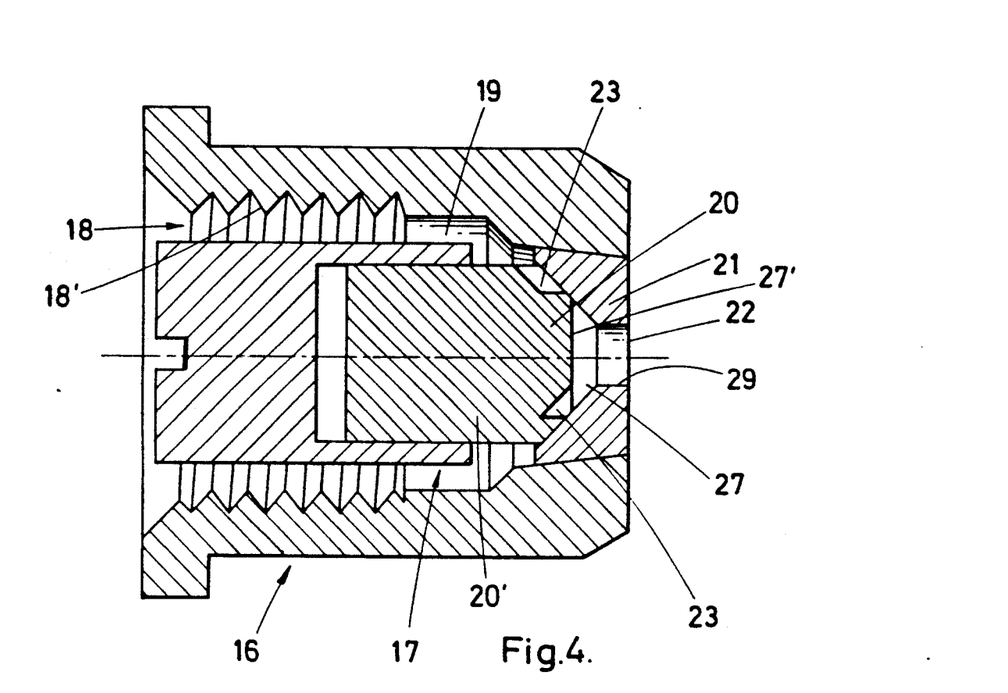
FIG. 4 is, at a larger scale, a cross-section of a mouthpiece of the device illustrated in FIG. 3.

That mouthpiece 16 comprises a central core 17 which is screwed in a cylindrically shaped hollow body 18, in such a manner that a ring-shaped admission chamber 19 is formed around the core 17. The core 17 thus only shows at its back-part an external screw thread 17' which cooperates with the internal wall of the hollow body 18, and which is provided with a screw thread 18'. The core 17 shows an input piece having a truncated cone-shaped part 20 which penetrates in a funnel-shaped cavity 27 of the injector 21 provided with an injection aperture 22, which injector 21 is mounted on cone-shaped perforation in the head of the mouthpiece 16.

Figure 5:
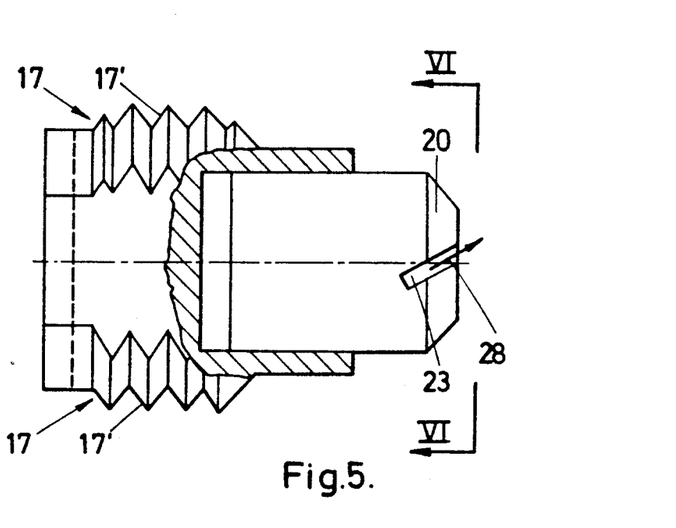
FIG. 5 is a side-view, with partial cross-section, of a particular component of the mouthpiece according to FIG. 4.
Figure 6:
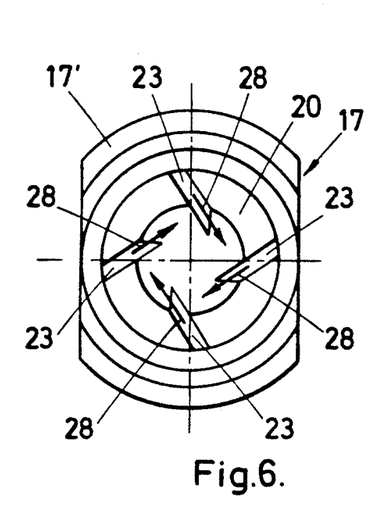
FIG. 6 is a view according to the line VI—VI of FIG. 5.

The truncated cone-shaped part 20 is, as has been clearly shown on a large scale in FIGS. 4, 5 and 6, provided at its wall with four grooves 23 allowing the injection apertures 22, to be connected to the ring-shaped chamber 19.

The four grooves 23 generally show a depth and a thickness of 0.1 mm to 2 mm and preferably of 0.3 to 1 mm. They are further equally distributed over the truncated cone-shaped part 20 of the core 17, and are excentrical and oriented according to a screw-form in such a manner that the reaction mixture, originating from chamber 19, is introduced according to a screw or whirl movement in the funnel-shaped cavity 27 of the injector 21, as clearly seen from the relative direction of the arrows 28, shown in FIGS. 4 to 6.

The funnel-shaped cavity 27 is elongated by a cylindrically shaped channel 29 which issues forth in the injection aperture 22.

According to the invention, the cylindrically shaped channel 29 shows a length from 0 to 3 mm, and preferably between 0.1 and 0.6 mm. It has indeed been established, on a somewhat unforeseen manner, that the form of the reation mixture beam which is formed at the output of the mouthpiece 16, is essentially determined by the length of the cylindrically shaped channel 29 for a reaction mixture with a same viscosity. More particularly, by adequately choosing that length can be obtained at the output of the mouthpiece a beam which has the characteristics defined hereabove, and more particularly as has been illustrated in FIG. 2.

It is essential, according to the invention, that the cylindrically shaped channel be relatively short compared to the length of that part by the known mouthpieces, which are for example used for spraying paints having a viscosity beneath 20 centipoises. In some cases this may be totally nonexistent. It has thus been established that, when the cylindrically shaped channel is relatively long, it is no longer possible to form a film of liquid at the output of the mouthpiece 16, which film of liquid extends according to the surface of a cone, as has been explained hereabove.

The injection aperture 22 generally has a diameter of 0.2 to 5 mm and preferably of 0.7 to 2 mm.

The truncated cone part 20 of the core 17 even as the injector 21 are preferably manufactured in tungstene carbide, though other materials with enough hardness and resistance against use can also be used.

In FIGS. 7 to 11, a second embodiment of a mouthpiece according to the invention is illustrated.

The concept of that mouthpiece is similar to those shown in FIGS. 3 to 6, whereas the construction thereof shows some differences.

It is a main object to realize a mouthpiece of which the outer dimensions are as small as possible, in order to easily and in an efficient way reach the places of a surface to be covered with polyurethane and which are the most difficult to reach.

In the second embodiment, the core 17 is directly mounted on a cylindrical extension piece 21' of the injector 21. There is spared in the cylindrical part 20' of the core, which is backwards situated with respect to the funnel-shaped cavity 27, a sufficiently large diametrally extending groove 19 which forms said supply chamber. That supply chamber is then also in connection, at the one hand, with the grooves 23 provided in the truncated cone-shaped part 20. On the other hand, it is connected with the mixture chamber 9. The part 20 of the core 17 shows only two grooves 23 which extend diametrically opposite against each other. If required, more grooves can of course be provided. In the case of four grooves, for example, it is enough to provide in the part 20' of the core 17 two grooves 19 which extend perpendicular to each other which connect these grooves 23 to each other.

For certain applications, where the spraying is in shallow small holes or moulds, it is important that a small spray pattern be used. That is to say, it is necessary that the angle $\alpha$ (see FIG. 2) is relatively small, in order to minimize the losses ("overspray"). Therefore, according to the invention, for that kind of application, use is advantageously made of the injector 21 of which the inclination angle $\beta$ in the injector 21 is relatively sharp and smaller than 30°, while the dimensions h' and h''' are enlarged.

The FIGS. 12 to 15 relate to a third embodiment of a mouthpiece 16 according to the invention. This embodiment distinguishes from the other essentially by the fact that there is no central core 17 present and that the grooves 23 are provided in the injector 21 in the border 30 of the funnel-shaped cavity 27 of the latter. The border 30 joints the flat inner face 31 of the hollow body 18 wherein said injector 21 is screwed. The latter further shows at its frontside a relatively high upstanding border 32 which is provided with an external screw thread 32' serving to fix the injector 21 in the body 18. In this manner, the injection aperture 22 is somewhat sunk in the body 18 and at the other side of that aperture 22 a protection zone 33 is formed for the liquid beam at the output of the injector.

In order to realize in an advantageous manner the object of the latest two embodiments as set out hereabove, it could be important, according to the invention, to fix the mouthpiece 16 at the free-end of a tube-shaped element 34 which connects the mouthpiece to the mixing chamber 9, via the conduct 15. That element can for example be formed by a static mixer as has been showned in FIG. 16 and which is known on its own.

Figure 16:
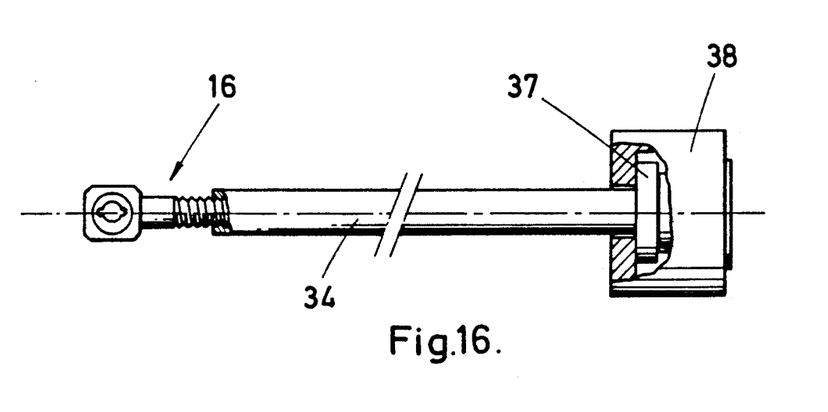
FIG. 16 represents partially longitudinal sections of the mouthpiece according to FIGS. 12 and 13 before it is mounted on another part of a particular embodiment of the invention.

Herewith is it important that the outer diameter of the mouthpiece 16 itself and the connexion means of the latter with the element 34 are not substantially larger than that latest.

According to the invention the body 18 of the two latest embodiments is also essentially tube-shaped except perhaps for the head 35 thereof, which is flattened and forms the free end of the mouthpiece, and the extremity of the hollow body 18 which is situated at the opposite side of the head 35 is provided with a screw thread 36. The tube-shaped body shows a longitudinal perforation 39 which extends starting from the supply chamber 19 until the extremity of the body situated at the other end.

In this manner, the mouthpiece 16 can easily be screwed on the free end of that element 34, which is thus also provided with a screw thread.

In a second embodiment of the mouthpiece, there is an internal screw thread 36, in such a manner that the body 18 thereof is screwed on the outer side of element 34. In the third embodiment, that screw thread is external so that the free end of the hollow body 18 is screwed in the free end of the element 34, as has been showed in FIG. 16.

The axis of the cylindrical channel 29 with the injection aperture 22 is perpendicular on the one of the tube-shaped element 34. That latest shows at the extremity, situated at the other side of its free extremity, a collar 37 which is fixed on the mixer head 4, as has been illustrated in FIG. 3, by means of a shell-shaped bolt 38.

Figures 17, 18, 20:
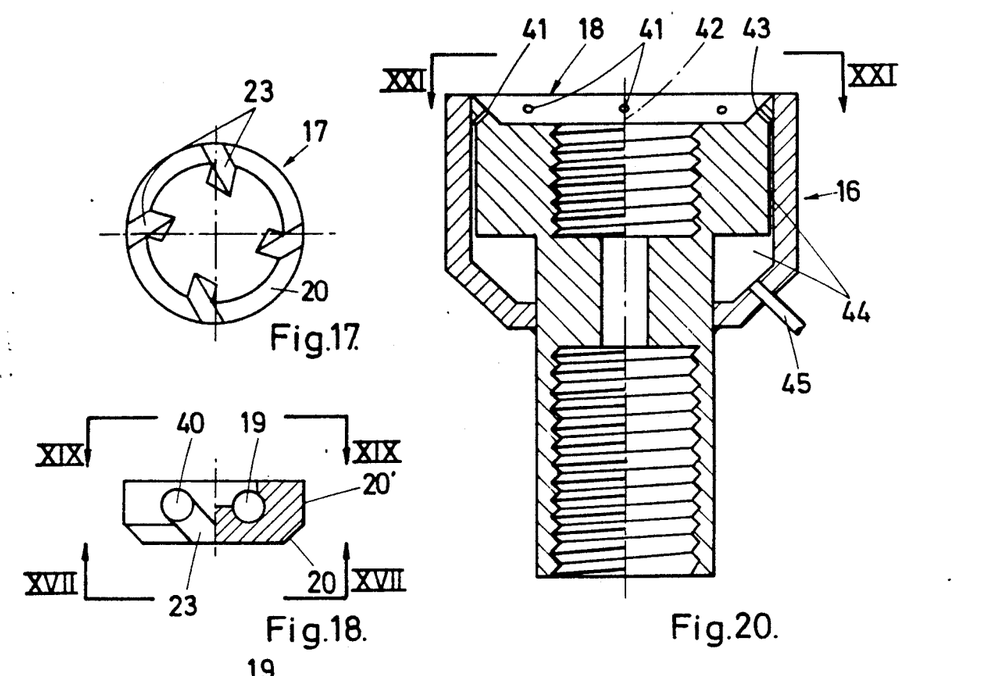
FIG. 17 is a front view according to line XVII—XVII of FIG. 18, of a further embodiment of a particular component according to FIG. 9.
FIG. 18 is a lateral view with a partial cross-section according to the line XVIII—XVIII of FIG. 19.
FIG. 20 is a longitudinal section according to the line XX—XX of FIG. 21 of a further embodiment of a mouthpiece according to the invention.
Figures 19, 21:
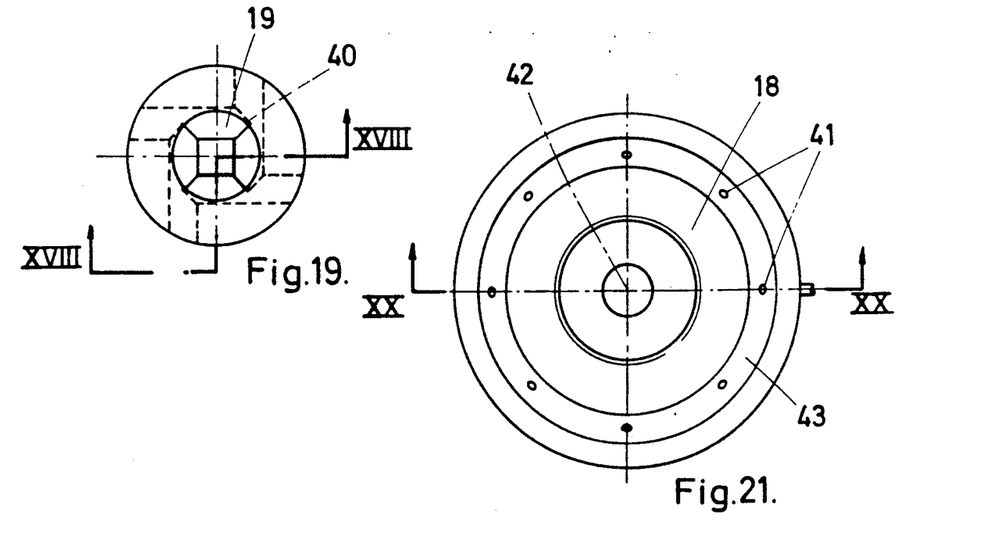
FIG. 19 is a back view, according to the line XIX—XIX of FIG. 18.
FIG. 21 is a front view according to the line XXI—XXI of FIG. 20.

In FIGS. 17 to 19, another particular embodiment of the core 17 is illustrated which could, for example, replace the core of the second embodiment of the mouthpiece according to the invention and which has been illustrated in FIGS. 7 to 11.

Figure 9:
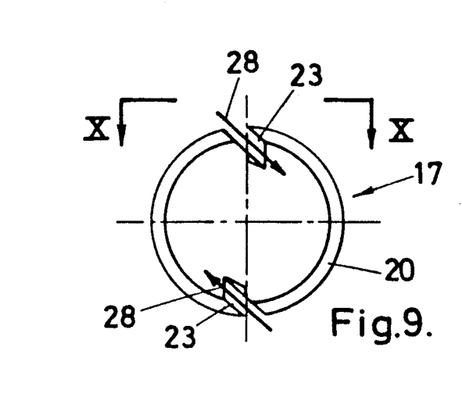
FIG. 9 is, at a larger scale, a front view according to the line IX—IX of FIG. 10 of a particular component of the mouthpiece according to the FIGS. 7 and 8.
Figure 10:
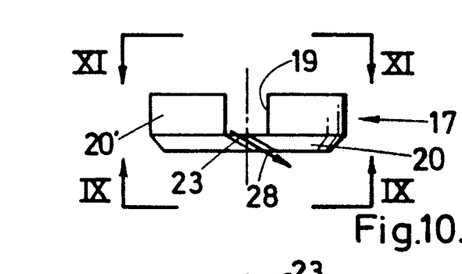
FIG. 10 is a side view of the same component according to the line X—X of FIG. 9.
Figure 11:
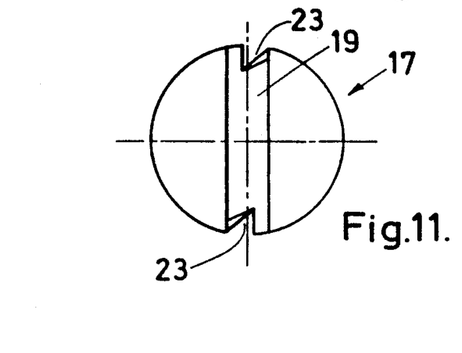
FIG. 11 is a back view according to the line XI—XI of FIG. 10 of that component.
Figure 12:
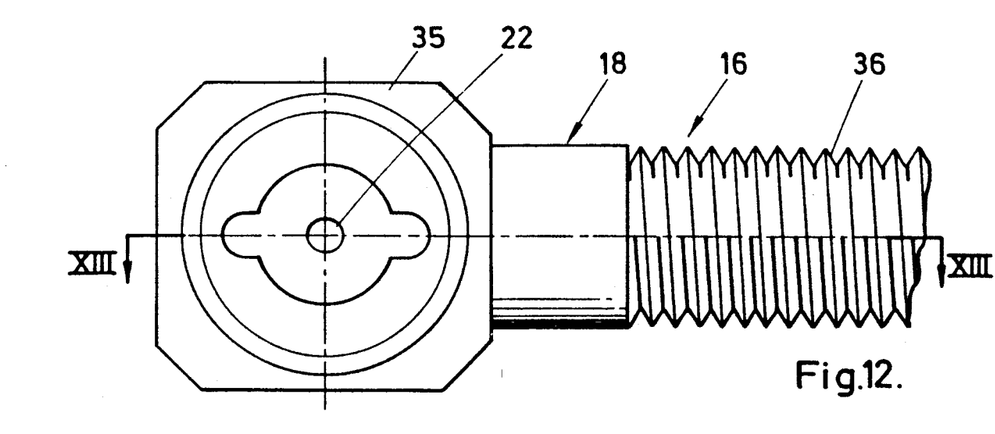
FIG. 12 is a front view of the mouthpiece according to a third embodiment of the device according to the invention.
Figure 13:
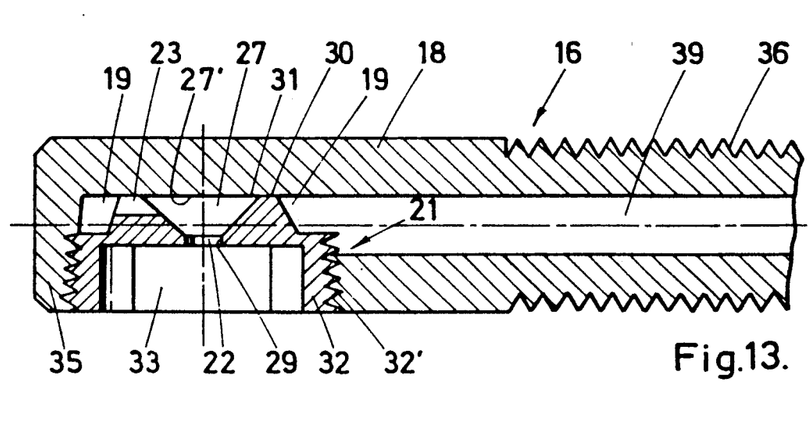
FIG. 13 is a longitudinal section according to the line XIII—XIII of FIG. 12.
Figure 14:
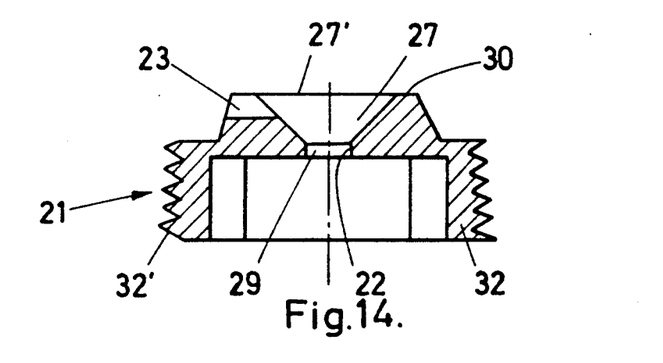
FIG. 14 is a similar cross-section, at a larger scale, of particular component of the embodiment according to FIGS. 12 and 13.
Figure 15:
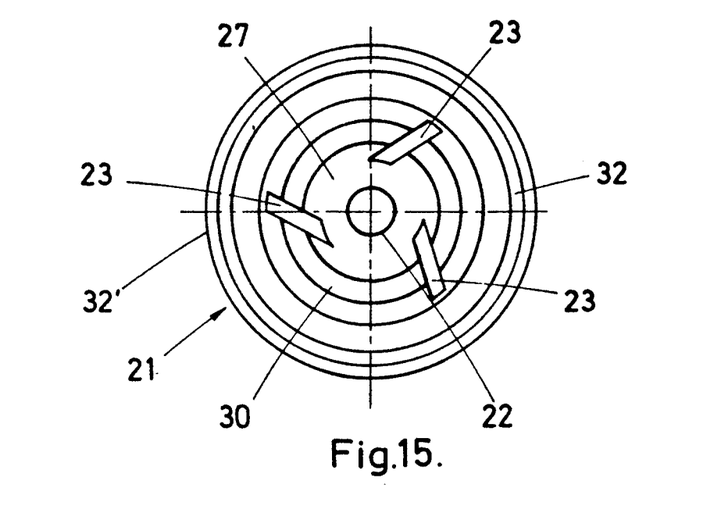
FIG. 15 is a back view according to the line XV—XV of FIG. 14.

That core distinguishes from the one illustrated in FIGS. 9 to 11 by the fact that the supply chamber 19 is formed by a central sparing instead of a groove which extends diametrically in the back part 20'. That central sparing is connected, via cylindrically shaped perforations 40, with the four grooves 23, which are equally disposed over the truncated cone-shaped wall of the part 20 of the core 17 and which are oriented screw-formed with respect to the axis of that part 20. These perforations, which have been carefully realized, extend from the central chamber 19 to the grooves 23.

On a rather unexpected way it has been established that, thanks to the use of such a core, an extremely stable and regular spray pattern has been obtained. The cone of liquid formed during the spraying, as has been illustrated in FIG. 2, shows a substantially circular cross-section perpendicular to its axis and a thickness of the wall which is substantially everywhere constant in its cross-section. There upon, such a core is much easier to reproduce.

Finally, FIGS. 20 and 21 show a further embodiment of a mouthpiece 16 according to the invention.

This mouthpiece is distinguished from the previously presented one by the presence of means enabling to control the spray pattern independently of the throughput, more particularly the surface of the on its axis perpendicular cross-section of the sprayed cone of liquid, as schematically illustrated in FIG. 2.

According to a particular embodiment of the invention, this is realized by air control, that is to say by means of a curtain of compressed air which is formed around the sprayed cone of liquid and which enables, by controlling the throughput of the compressed air, the application of a well determined lateral pressure on the face of the cone 7 (see FIG. 2) and to bend it towards inside.

Figure 7:
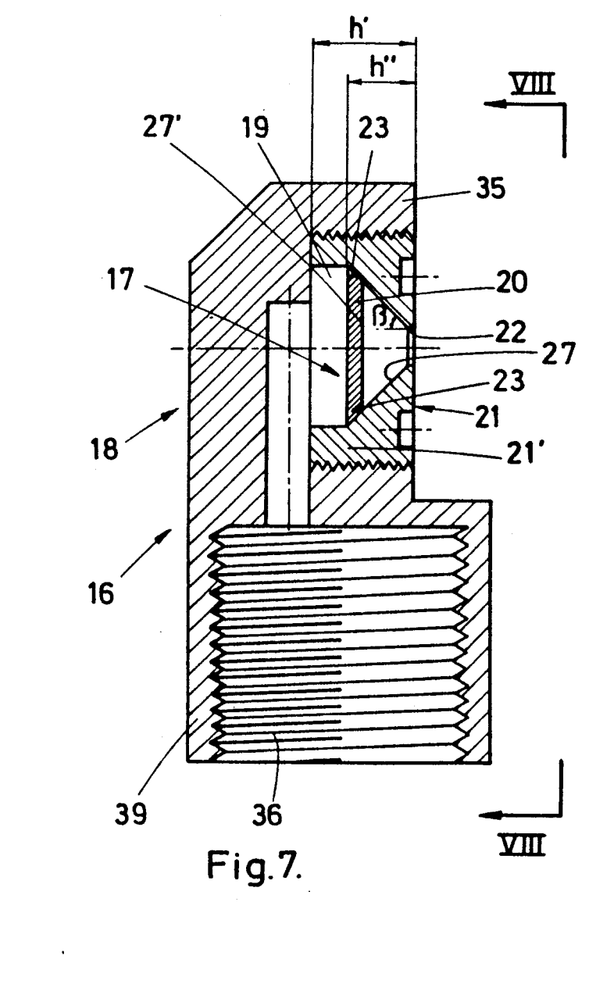
FIG. 7 is a longitudinal section according to the line VII—VII of FIG. 8 of a second embodiment of a mouthpiece according to the invention.
Figure 8:
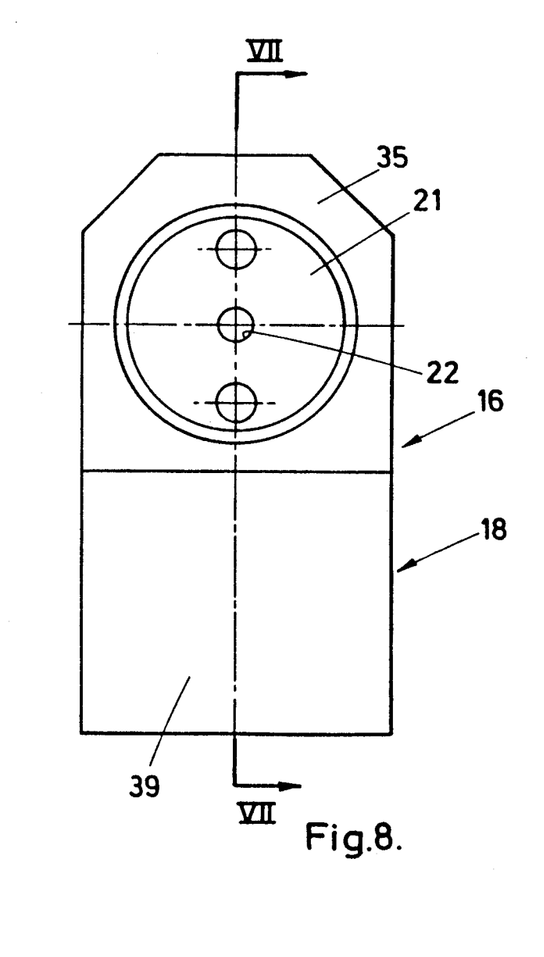
FIG. 8 is a front view according to the line VIII—VIII of FIG. 7.

Thereto there are provided, around the cylindrically shaped hollow body 18, wherein the non-represented injector 21 with the core 17 placed therein has to be screwed in a manner, as has been illustrated in FIG. 7, in said mouthpiece 16 a number of small holes 41, which are situated on a concentrical circle with the injection aperture 22 of the injector 21 and which oriented according to a same angle towards the axis 42 of that injection aperture 22.

The small holes 41 are situated in an oblique surface at the inner side of a border 43 of said body which is upstanding with respect to the axis 42 and which has a communication with a ring-shaped chamber 44 which extends around the body 18 and on which a compressed air conduct 45 is connected. By controlling the throughput of the compressed air supplied via the conduct 45, the pressure of the compressed air stream can be controlled, this compressed air stream being oblique oriented on the outher side of the cone wall 7, by means of the holes 41, according to which that cone wall can be bent towards the axis 42.

The invention is again of interest for applications wherein there is sprayed in shallow small moulds and where the losses of spraying have to be minimized.

If use is made of a core 17 and an injector 21 as has been illustrated in FIGS. 17, 19 and 7, it is possible to control by means of computer control, beside the displacement speed of the mouthpiece 16 in function of its place and with respect to the mould, as well the throughout liquid at the injection aperture 22 as the surface of the perpendicular cross-section of the cone in function of the place of the mouthpiece 16 with respect to the mould on which there has to be sprayed.

Hereafter the working conditions are given by means of two practical examples for spraying a reaction mixture of polyol, isocyanates and polyurethane.

| Parameters | Example 1 | Example 2 |
| --- | --- | --- |
| Throughput of the reaction mixture (g/sec) | 25 | 10 |
| Pressure of the polyol (bar) | 150 | 150 |
| Pressure of the isocyanates (bar) | 100 | 100 |
| Dimension of the drop ($\mu$) (M.V.D. values) | 2000 | 1000 |
| Angle of the cone (°) | 35 | 27 |
| Height $h_1$ of the cone (mm) | 50 | 25 |
| Distance d between the mouthpiece 16 and the surface 25 to be covered (mm) | 200 | 100 |
| Number of grooves 23 in the truncated cone-shaped input piece 20 of the mouthpiece 16 | 4 | 2 |
| Depth of the grooves (mm) | 0.50 | 0.30 |
| Thickness of the grooves (mm) | 0.50 | 0.30 |
| Diameter of the spray aperture 22 (mm) | 1.52 | 0.71 |
| Length of the cylindrical part 29 (mm) | 0.6 | 0.2 |

EXAMPLES OF REACTION MIXTURES

It concerns here more particularly reaction mixtures which have been the object of the Belgian patents nos. 852,337 and 882,058, which also belong to the applicant.

EXAMPLE 1

1) Characteristics of the polyol (first component)

| Formula in parts by weight | |
| --- | --- |
| Polyether-triol which is obtained by adding popylene oxide and ethylene oxide to glycerine as initiator (OH index:35; ratio on primary OH radicals:80%) | 100 |
| Ethylene-glycol | 5 |
| N'N-dimethylbutadiamine | 5 |
| Lead-octoate (33% lead metal) | 0.7 |
| Colour paste | 5 |
| | 115.7 |
| Characteristics | |
| Viscosity at 25° C. in MPa.s | 1170 |
| Viscosity at 45° C. in MPa.s | 300 |
| Viscosity at 45° C. in MPa.s | 150 |
| Viscosity at 65° C. in MPa.s | 150 |
| Density (21°) | 1.02 |

2) Characteristics of the isocyanate (second component)

Formula (in parts by weight)

| | |
| --- | --- |
| Quasi-prepolymere (100 parts isophorondiisocyanate + 13.28 parts dipropylene glycol — end ratio at NCO group: 26%): | 67.1 |
| Dimethylstanodineodecanoate | 1 |
| | 68.1 |
| Characteristics | |
| Viscosity at 25° in MPa · s: | 1450 |
| Viscosity at 45° in MPa · s: | 350 |
| Viscosity at 65° in MPa · s: | 50 |
| Density (21°) | 1.07 |
| Ratio $\dfrac{\text{polyol component}}{\text{isocyanates component}} = \dfrac{115.7}{68.1} = 1.7$ | |

EXAMPLE 2

Characteristics of the polyol (first component)

I. Formula (in parts by weight)

| | |
| --- | --- |
| Polyether-triol of the same type as in Example 1: | 90 |
| Dabco 33 Lv (triethylene diamine; 33% | 2.25 |

-continued

| in solution of DPG): | |
|---|---|
| Butane-diol | 7.9 |
| Colour paste | 5 |
| | 105.15 |
| Characteristics | |
| Viscosity at 25° in MPa · s: | 1060 |
| Viscosity at 45° in MPa · s: | 320 |
| Density (21° C.): | 1.02 |

2) Characteristics of the isocyanate (second component)

Formula

| Isocyanates RMA 200 (Upjohn): | 43.5 |
|---|---|
| Characteristics | |
| Viscosity at 25° C. in MPa · s: | 620 |
| Viscosity at 45° C. in MPa · s: | 126 |
| Density (21° C.): | 1.21 |
| Ratio: $\frac{\text{polyol component}}{\text{isocyanates component}} = \frac{105.15}{43.5} = 2.42$ | |

From the different experiments, which have been given in the examples hereabove, it can be concluded that by using a method and a device according to the invention, it is possible to obtain a substantially complete uniformity with respect to the distribution of the elastomer layer on the surface to be covered, with respect to the homogeneity of the colour and of other physical characteristics of the layer. Further this is accomplished by using one single passage of the mouthpiece over the surface.

The invention is naturally in no way limited to the examples given hereabove and within the scope of the patent application several changes could be envisaged, under more with respect to the composition of the used components and the construction of the mouthpiece. Thus in principle the static mixer 34 has to be provided between the mixture chamber 9 and the mouthpiece 16, for example when the homogeneity of the mixture leaving the chamber 9 is unsufficient.

Also several constructions of the mouthpiece 16 are possible and eventually other means than grooves 23 can be used in order to realize the screw or whirl movement of the liquid to be sprayed through the spray aperture 21.

What is claimed is:

1. A method for forming a gellified polyurethane layer on a surface by spraying a liquid reaction mixture comprising polyol and issocyanates and having a viscosity between 20 and 2000 centipoises, said mixture being sprayed in form of a film which extends in the shape of a surface of a cone and which, depending on the spray distance, reaches said surface as a film or is broken up into drops before reaching said surface, said drops having a mean volume diameter which according to the standards ASTM E 779-81, is larger than 100 microns and smaller than 5000 microns.

2. A method according to claim 1, in which said mixture is sprayed in form of a film which extends from a mouthpiece according to a cambered cone, a top angle α being between 5° and 80°.

3. A method according to claim 2, wherein said mixture is sprayed in form of a film which extends from a mouthpiece according to a cambered cone having a height comprised between 0.5 and 20 cm.

4. A method according to claim 1, wherein drops are formed, a main part of which has a mean diameter between 500 and 5000 microns.

5. A method according to claim 1, wherein said mixture is sprayed on said surface with a throughput between 5 and 100 g/sec.

6. A method according to claim 1, wherein there is formed, by spraying said mixture on said surface, a polyurethane layer with a minimum thickness of 0.3 mm.

7. A method according to claim 1, wherein a reaction mixture of polyol, isocyanates and addition substances is used which permits the formation of said gellified polyurethane layer which is substantially stable to light.

8. A method according to claim 1, wherein said mixture is sprayed with a throughput which varies with respect to the place in the mould, whereby a maximum throughput is used for zones of said mould which are relatively easy to spray and a minimum throughput is used for zones which are relatively difficult to reach and to spray.

9. A method according to claim 2, wherein, along outer sides of said cone, a stream of compressed air is provided having an adjustable speed, which stream enables said cone wall formed by said drops or said film of sprayed mixture to be bent.

10. A method for forming a gellified polyurethane layer on a surface by spraying a liquid reaction mixture comprising polyol and isocyanates and having a viscosity between 20 and 2000 centipoises, said mixture being sprayed in form of a film which is broken up into drops before reaching said surface, said drops having a mean volume diameter which according to the standards ASTM E 779-81, is larger than 100 microns and smaller than 5000 microns.

* * * * *

UNITED STATES PATENT AND TRADEMARK OFFICE
CERTIFICATE OF CORRECTION

PATENT NO. : 5,071,683

DATED : 12/10/91

INVENTOR(S) : Verwilst et al

It is certified that error appears in the above-identified patent and that said Letters Patent is hereby corrected as shown below:

Column 1, line 42, change "779-81" to --799-81--;

Column 3, lines 34, change "standards ASTM E 779-81 higher" to --standards ASTM E 799-81 higher--.

In the Claims

Column 10, claim 1, line 5, change "779-81" to --799-81--;

claim 10, line 50, change "779-81" to --799-81--.

In the Abstract line 7, change "779-81" to --799-81--.

Signed and Sealed this

Fifth Day of October, 1993

*Attest:*

BRUCE LEHMAN

*Attesting Officer*   Commissioner of Patents and Trademarks